Patented Dec. 15, 1953

2,662,838

UNITED STATES PATENT OFFICE 2,662,838

COMPOSITION FOR PREPARING SOLDERED METAL SURFACES FOR PAINTING

Gerald E. Oven, Detroit, and William Suter, Melvindale, Mich., assignors to Kaiser-Frazer Corporation, Willow Run, Mich., a corporation of Nevada No Drawing. Application August 9, 1950, Serial No. 178,561

3 Claims. (Cl. 148—6.16)

This invention relates to a novel composition and procedure for preparing and sealing solder-metal surfaces for painting and to the product produced thereby.

In the manufacture of finished sheet-metal products and particularly in the fabrication of automobile bodies, it is conventional practice to weld preformed individual panels together and to fill the joint between the panels with solder metal. In many instances, the solder area exposed at the joint is relatively large. Commercially available solders are somewhat porous, and the solder area is characterized by minute surface pits or cavities which cause trouble when a finish coat of enamel or the like is applied to the sheet metal.

In the automotive industry the presence of these minute surface pits in the solder areas between the skin panels of the automobile body has been a particular source of trouble. Preparatory to painting, each fabricated body is first subjected to conventional phosphate cleaning and processing which cleans the metal and leaves a rust-resistant phosphate coating thereon. One or more coats of primer are then applied to the body. After each primer coat is applied, the body is passed between banks of infrared bulbs which dry the primer and the dry primer coat is rubbed down with wet sand or the like. A final coat of enamel is then sprayed on the body and the latter is baked to dry the enamel.

Heretofore there has been a relatively large proportion of imperfect paint jobs due to the presence of blemishes commonly referred to as "pits" or "pops" in the enamel finish. These blemishes may appear as small openings or ruptures in the enamel film, as blisters, or merely as small wrinkled areas. Regardless of their form, however, the blemishes require that the body be refinished causing production delays and increasing production cost.

The blemish condition referred to above appears on the solder areas and apparently is caused by the presence of moisture or acid in the surface cavities of the solder. Exploratory experiments indicate that liquid in the surface cavities of the solder is vaporized when the metal is heated particularly to the temperatures required to bake the final enamel finish, and pressure of the vapor against the overlying film ruptures, blisters, or otherwise distorts the enamel finish. In any event, it has been found that the particular blemishes referred to are eliminated if the solder surfaces are pretreated according to the instant invention to fill the cavities.

The problem of finding a material capable of completely and solidly filling the minute surface cavities, which bonds to the solder properly so that the filler does not chip or flake away from the base metal under service conditions, which is commercially available in sufficient quantities at a reasonable price, is capable of easy application and does not involve a health hazard in use, has been exceedingly difficult of solution.

We have discovered a filler material which is pre-eminently satisfactory in every respect above mentioned, and we have devised a quick and efficient procedure for treating or processing the metal with the filler. Broadly, our procedure comprises first applying an alcohol solution of phosphoric acid to the solder surface and then thoroughly and uniformly coating the previously treated surface with a paste of metallic zinc dust in alcohol preferably containing zinc chromate.

The following acid-alcohol solution has been found satisfactory and is given as a specific typical example of the solution.

| | Per cent by weight |
|---|---|
| Phosphoric acid | 3.65 |
| Distilled water | 3.85 |
| Isopropyl alcohol | 92.50 |

Apparently the phosphoric acid reacts with the solder to form a surface film of metal phosphate, and this film in turn reacts with the zinc dust and zinc chromate which is applied subsequently in paste form. Thus, the phosphoric acid cleans the surface and also forms a bonding media which unites the zinc dust and zinc chromate to the solder. The isopropyl alcohol forms a solution of the phosphoric acid and also serves as a wetting agent which facilitates reaction between the acid and the metal. The exact proportions given in the example are optimum only. They are not critical and can be varied within relatively wide limits without departing from the spirit of the invention. As the proportion of phosphoric acid is decreased, the reaction becomes progressively slower. On the other hand, as the proportion of phosphoric acid is increased, the reaction becomes progressively faster, but no advantage is gained above those achieved when the acid is used in the optimum amount.

The following paste composition is a typical example of the metallic filler material.

| | Per cent by weight |
|---|---|
| Metallic zinc dust | 69.0 |
| Pigment zinc chromate | 13.1 |
| Isopropyl alcohol | 17.9 |

As in the case of the alcohol-acid solution the specific proportions of alcohol to the rest of the mixture are not critical but are merely optimum. However, as the proportions of the various elements are changed, the advantages of the invention are progressively lost. As suggested, the individual particles of zinc dust apparently react with the metal phosphate film. However, pure zinc dust is highly reactive with the bonding film and is thus difficult to apply properly to the metal surface. The zinc chromate apparently in some manner slows the reaction between the metallic zinc dust and the metal phosphate film so that the paste can be applied easily and without danger of harmful effects. Optimum benefit apparently is obtained if the metal chromate is incorporated in about the proportions given but some slight variation from the amounts given is permissible. The alcohol in the paste apparently serves as a wetting agent which facilitates and expedites molecular bonding of the metal particles to the metal phosphate film.

The solid moiety of the specific paste example given above comprises 84% by weight of metallic zinc dust and 16% by weight of pigment zinc chromate. The metallic zinc dust employed has a specific gravity of 7.06, weighs 58.81 pounds per gallon, and a maximum of 1% passed a 325-mesh screen. Metallic zinc dust having these properties was satisfactory, but it is obvious that a variety of commercially available grades of metallic zinc powder would be suitable. It is important that the metal particles be sufficiently small so that they are capable of completely and substantially uniformly filling the surface cavities in the solder. Also, it is desirable, of course, that the zinc be relatively pure in order to assure a uniform final product. The particular pigment zinc chromate employed has a specific gravity of 3.5, weighs 29.16 pounds per gallon and passed a 325-mesh screen. Pure zinc chromate is satisfactory, and commercially available grades of pigment zinc chromate can be used, although they contain some alkali metal chromates and occasionally some zinc oxide.

In operation, the acid-alcohol solution can be applied conveniently to the metal surface manually by means of a soft rag. The rag should be sufficiently saturated to soak the cleaner thoroughly into the solder pores. This step insures good adhesion of the phosphate film. The paste also can be applied manually, using a soft, coarse cloth such as burlap or the like. It preferably is applied using a circular, overlapping motion and sufficient pressure to force metal particles in the paste solidly into surface cavities of the solder. After the entire surface area of the solder has been entirely coated with the paste in the manner described above, the excess is wiped off and the remaining film is permitted to dry. The surface is then ready for painting, and the phosphate surface film resulting from the pretreating procedures of this invention prevents formation of undesirable "pits" or "pops" in baked enamel or equivalent coatings subsequently applied.

Having thus described the invention, we claim:

1. A composition for treating solder-metal surfaces that have been prepared for such treatment by application thereto of an alcohol solution of phosphoric acid consisting of about 84% by weight of metallic zinc dust and about 16% by weight of pigment zinc chromate intimately mixed together with a sufficient amount of isopropyl alcohol to form a paste.

2. A composition for treating solder metal surfaces that have been prepared for such treatment by application thereto of an alcohol solution of phosphoric acid consisting of about 69% by weight of metallic zinc dust, about 13% by weight of pigment zinc chromate, and about 18% of an isopropyl alcohol.

3. An article including a solder-metal area having surface pits or cavities filled with a reaction product which results when an alcohol solution of phosphoric acid is first reacted with a solder metal and the ensuing product is reacted with a paste of about 84% metallic zinc dust and about 16% pigment zinc chromate, said fillings being bonded to the wall surfaces of said pits by reaction of the phosphoric acid portion of said reaction product with the solder metal forming the wall of the cavity.

GERALD E. OVEN.
WILLIAM SUTER.

References Cited in the file of this patent

UNITED STATES PATENTS

| Number | Name | Date |
|---|---|---|
| 1,291,352 | Allen | Jan. 14, 1919 |
| 1,398,507 | Gravell | Nov. 29, 1921 |
| 1,837,430 | Gravell | Dec. 22, 1931 |
| 1,949,713 | Gravell | Mar. 6, 1934 |
| 2,142,024 | Hall | Dec. 27, 1938 |
| 2,251,846 | Leisy | Aug. 5, 1941 |
| 2,385,800 | Douty | Oct. 2, 1945 |
| 2,426,445 | Frisch | Aug. 26, 1947 |
| 2,471,010 | Rector | May 24, 1949 |
| 2,525,107 | Whiting et al. | Oct. 10, 1950 |